(12) United States Patent
Forsyth et al.

(10) Patent No.: US 6,888,909 B2
(45) Date of Patent: May 3, 2005

(54) REACTOR PRESSURE VESSEL

(75) Inventors: David R. Forsyth, Cheswick, PA (US); David A. Altman, Pittsburgh, PA (US); Kevin G. Bethune, Pittsburgh, PA (US); Michael F. Hankinson, Monroeville, PA (US); Robert H. McFetridge, Level Green, PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 48 days.

(21) Appl. No.: 10/401,284

(22) Filed: Mar. 27, 2003

(65) Prior Publication Data
US 2003/0227992 A1 Dec. 11, 2003

Related U.S. Application Data
(60) Provisional application No. 60/377,784, filed on May 3, 2002.

(51) Int. Cl.$^7$ .................................................. G21C 9/00
(52) U.S. Cl. ........................................ 376/294; 376/205
(58) Field of Search ................................. 376/294, 205, 376/263

(56) References Cited

U.S. PATENT DOCUMENTS

| 4,100,021 A | * | 7/1978 | Silverblatt .................. 376/463 |
| 4,786,461 A | | 11/1988 | Veronesi et al. |
| 5,110,536 A | * | 5/1992 | Chevereau .................. 376/285 |
| 5,278,876 A | * | 1/1994 | Sawabe ...................... 376/205 |
| 5,325,407 A | * | 6/1994 | Forsyth et al. .............. 376/205 |
| 5,528,640 A | * | 6/1996 | Johansson et al. .......... 376/313 |

* cited by examiner

Primary Examiner—Michael J. Capone
Assistant Examiner—Rick Palabrica

(57) ABSTRACT

A reactor pressure vessel supports the flanges of a core barrel assembly and an upper support plate. These flanges have aligned holes for diverting inlet coolant water to the vessel head for cooling the head. The aligned holes have different cross-sectional areas for controlling unexpected backflow of coolant water from the vessel head around the periphery of the upper support plate.

14 Claims, 3 Drawing Sheets

REACTOR PRESSURE VESSEL

CROSS REFERENCE

This application claims priority from U.S. patent application Ser. No. 60/377,784, filed May 3, 2002.

BACKGROUND OF THE INVENTION

This invention relates to reactor pressure vessels (RPVs) in pressurized water nuclear reactors (PWRs). It relates particularly to RPVs in which a small fraction of inlet coolant water is diverted from the main coolant in order to cool the RPV heads.

A PWR generally includes a closed loop of pressurized coolant water to transfer heat energy from fuel assemblies in the core region of a RPV to a secondary water system employed to generate steam. The closed loop operates at pressures of up to about 2250 psi or more and at temperatures of up to about 650° F. or more. The coolant water may be heated about 60° F. (e.g., from about 550° F. to about 610° F.) in a RPV and then cooled an equivalent amount by the secondary water system.

After decades of operation at high temperature and pressure, the wetted metal surfaces of RPVs (which generally are fabricated of stainless steel and nickel base alloys) contacted by the circulating coolant water are experiencing stress corrosion cracking. One well recognized method of reducing the susceptibility of metals to stress corrosion is to reduce the temperature of the wetted metal surface. Tests have shown that crack initiation times can be reduced significantly by reducing temperatures of the RPV heads by just 10° F.

Accordingly, and in addition to other RPV thermal-hydraulic modifications, RPV components have been redesigned or modified to divert relatively cool inlet coolant water away from the main coolant water path and toward the RPV heads in order to cool the RPV heads. Thus, RPVs may have coolant water flow holes machined in the flanges of core barrel assemblies and upper support assemblies to provide a flow path for the diverted inlet coolant water. See, e.g., U.S. Pat. Nos. 5,325,407 and 4,786,461.

The inventors have found that, although the flow patterns of U.S. Pat. Nos. 5,325,407 and 4,786,461 will provide the desired cooling effects, the diverted coolant flow may not provide the expected flow of coolant water into the RPV heads in all circumstances. Specifically, it has been found that the flow of coolant water through the holes in the upper support plates can induce coolant water in the RPV heads above the upper support assemblies to leak back into the space between the flanges and dilute the diverted coolant water somewhat like a jet pump aspirating surrounding fluid. In one test, the loss factor ("k") of Bernoulli's equation Pressure Differential=$k$(Velocity)$^2$/2(gravitational constant)

was determined to be 1.6 where a loss factor of 1.1 was employed in the design of the holes.

Thus, the quantity of diverted flow of coolant water into the RPV head and its temperature may not be sufficient to cool the head in accordance with the design.

SUMMARY OF THE INVENTION

It is therefore an object of this invention to provide an improved RPV design for controlling the flow of diverted coolant water into the RPV heads. It is another object of this invention to reduce the susceptibility of coolant water leakage from the RPV head region back into the space between the core barrel support assembly flanges and the upper support assembly flanges.

It has been discovered that the foregoing objects can be attained in a reactor pressure vessel (RPV) for containing nuclear fuel assemblies in coolant water by providing: a vessel body having an internal support ledge; a core barrel assembly having a flange supported on the internal support ledge for supporting the fuel assemblies, the core barrel assembly flange having holes extending between a lower flange surface and an upper flange surface, each hole having a cross-sectional area; and an upper support plate having a flange with a lower flange surface and an upper flange surface, the lower surface of the upper support assembly flange disposed above the upper surface of the core barrel assembly flange, the upper support plate flange having holes extending between its lower surface and its upper surface and aligned with the holes in the core barrel assembly, each upper support plate flange hole having a cross-sectional area, wherein the cross-sectional area of the upper support plate flange hole is different from the cross-sectional area of the aligned core barrel assembly flange hole.

Advantageously, the relative sizes of the aligned holes in the flanges can be designed in RPVs to better control the inlet coolant water that is diverted from the main stream and to reduce the backflow leakage.

In a preferred practice of the present invention, existing RPVs can be backfit to utilize existing holes in the core barrel assembly flanges having cover plates blocking the holes. In this practice, the RPV has: a vessel body having an internal support ledge; a core barrel assembly having a flange supported on the internal support ledge for supporting the fuel assemblies, the core barrel assembly flange having holes extending between a lower flange surface and an upper flange surface with cover plates welded to the bottom surface of the core barrel assembly flange extending under the holes, each cover plate having a hole extending therethrough with each cover plate hole having a cross-sectional area; and an upper support plate having a flange with a lower flange surface and an upper flange surface, the lower surface of the upper support plate flange disposed above the upper surface of the core barrel assembly flange, the upper support plate flange having holes extending between its lower surface and its upper surface and aligned with the holes in the core barrel assembly, with each upper support plate flange hole having a cross-sectional area, wherein the cross-sectional area of each upper support plate flange hole is different from the cross-sectional area of the hole in the cover plate extending under the aligned core barrel assembly flange hole.

In another preferred practice of the present invention, existing RPVs can be backfit with exhaust nozzles to effectively increase the cross-sectional area of the upper support plates. In this practice, the RPV has: a vessel body having an internal support ledge; a core barrel assembly having a flange supported on the internal support ledge for supporting the fuel assemblies, the core barrel assembly flange having holes extending between a lower flange surface and an upper flange surface, each hole having a cross-sectional area; and an upper support plate having a flange with a lower flange surface and an upper flange surface, the lower surface of the upper support plate flange disposed above the upper surface of the core barrel assembly flange, the upper support plate flange having holes extending between its lower surface and its upper surface and aligned with the holes in the core barrel assembly, the upper support plate having exhaust nozzles extending from the holes and above its upper surface, each exhaust nozzle having an exit port having an exit area that is different from the cross-sectional area of the aligned hole in the core barrel assembly.

Other and further objects of this invention will become apparent from the following detailed description and the accompanying drawings and claims.

DESCRIPTION OF THE PREFERRED EMBODIMENT

Figure 1:
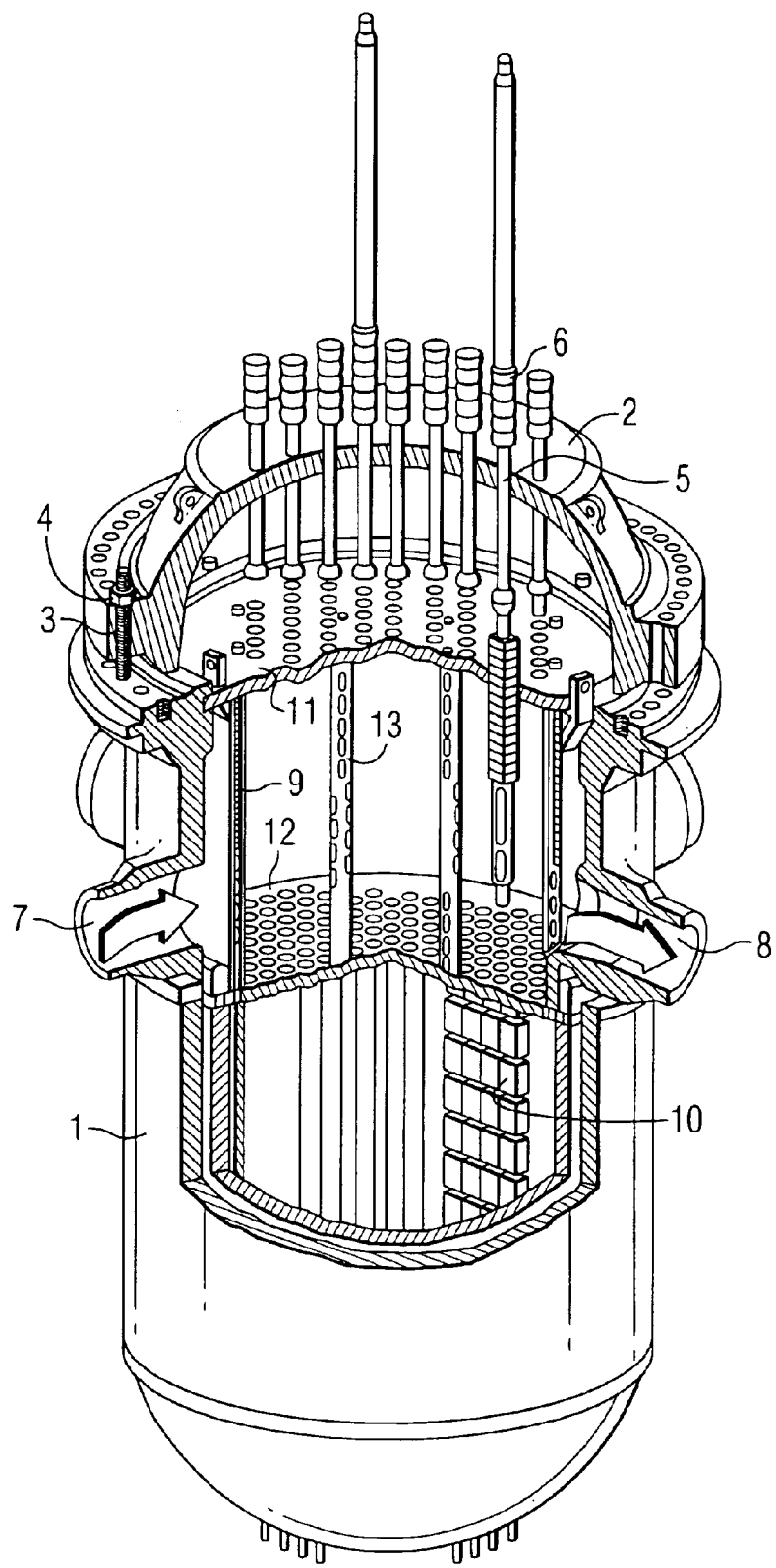
FIG. 1 is an isometric view, partly in section, of a typical reactor pressure vessel (RPV).

FIG. 1 generally illustrates the various components of a reactor pressure vessel (RPV) in a pressurized water reactor (PWR) for which this invention is applicable. The RPV is comprised generally of a cylindrical steel pressure vessel body 1 having a removable top head 2, each provided with cooperating flanges that can be bolted tightly together by a plurality of studs 3 and nuts 4 when the PWR is in service. The removable top head 2 has a plurality of penetration tubes 5 to accommodate control rod drive mechanisms 6 or to function as instrumentation ports for thermocouples or other control instrumentation. The susceptibility of these penetrations 5 to stress corrosion cracking can be reduced by reducing their temperature as much as reasonably possible. One method of reducing their temperature is to reduce the temperature of the coolant water in the vicinity of the penetrations.

The vessel body 1 has at least one coolant water inlet nozzle 7, at least one coolant water outlet nozzle 8, and a cylindrical core barrel assembly 9 for supporting fuel assemblies 10 in the core region of the RPV. The coolant water generally enters the vessel body 1 through the inlet nozzle 7 and flows down the annulus between the core barrel assembly 9 and the inner wall of the vessel body 1. The coolant water then turns upwardly at the bottom of the pressure vessel body 1 and flows upwardly through the fuel assemblies 10, a core support plate 12 and out of the vessel body 1 through the outlet nozzle 8 to a steam generator (not shown).

The vessel body 1 also has an upper support assembly including an upper support plate 11 for supporting the control rod drive mechanisms 6 and control rod guide tubes 13 for guiding the control rod drive mechanisms 6. The upper support assembly is also designed to permit coolant water to circulate between RPV head region and the region above the fuel assemblies 10 in order to cool the RPV head 2 and its penetrations. In a desirable flow pattern for cooling the RPV head 2, the diverted coolant water flows from the RPV inlet nozzle 7, through holes in the flanges of the core barrel assembly 9 (shown in FIGS. 2–4) and the upper support plate 11, into the RPV head 2, downwardly through flow spaces in the upper support assembly, and then into the region above the fuel assemblies 10.

Figure 2:
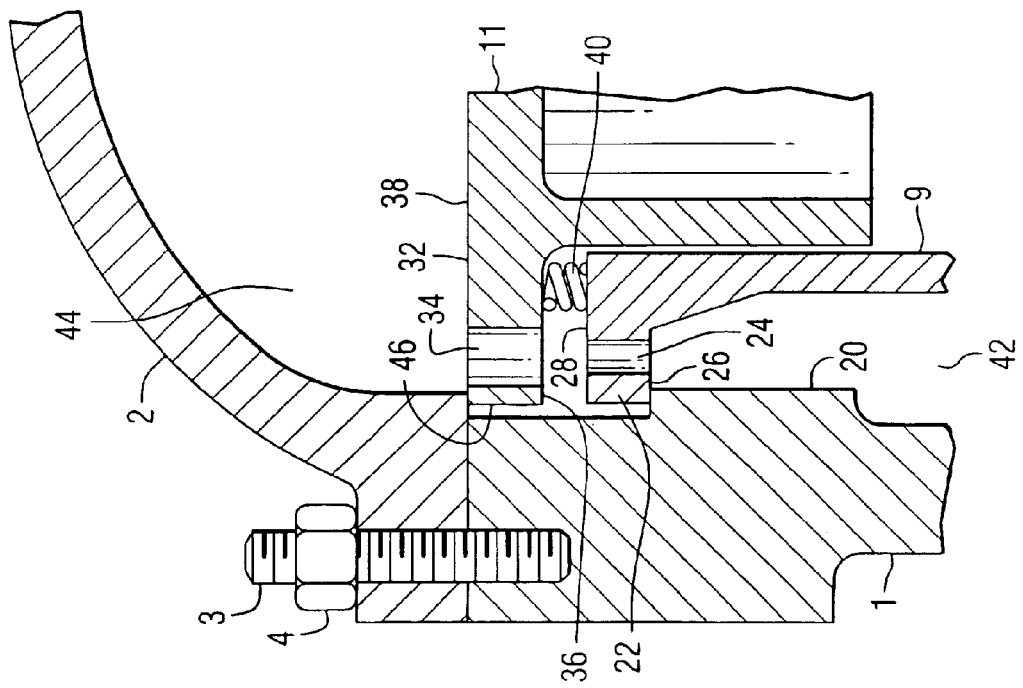
FIG. 2 is an enlarged fragmented sectional view of the RPV taken at the bracket shown in FIG. 1 showing a first embodiment of the present invention.

FIG. 2 generally shows a first preferred embodiment of the present invention. This figure generally shows the RPV region where the core barrel support assembly 9 and the upper support plate 11 are supported by the vessel body 1. The vessel body 1 has an internal support ledge 20 that supports a core barrel assembly flange 22. The flange 22 has holes (represented by hole 24) extending from a lower surface 26 to an upper surface 28. The upper support plate 11 has a flange 32. The upper support plate flange 32 has holes (represented by hole 34) extending from a lower surface 36 to an upper surface 38. Importantly, in the present invention, the holes in the flanges 22 and 32 are aligned such that the hole 24 in the core barrel assembly flange 22 is directly under the hole 34 in the upper support assembly flange 32. A spring 40 may be disposed between the core barrel assembly flange 22 and the upper support assembly flange 32 for supporting the upper support assembly 11 on the core barrel assembly 9.

As is shown in FIG. 2, the cross-sectional areas of the aligned holes in the flanges 22 and 32 of FIG. 2 (i.e., the areas taken parallel to the upper and lower surfaces) are different from each other, which enables the RPV designer to selectively design the pressure drops and velocities of the coolant water flowing through the holes 24 and 34 from the annular RPV region 42 communicating with the coolant inlet nozzle 7 into to the RPV region 44 in the RPV head 2. Preferably, the holes 34 are larger in diameter (and therefore have a larger cross-section) than aligned holes 24 for reducing the relative velocity of the coolant water and therefore the entrainment of coolant water leaking around the periphery 46 of the upper support plate flange 32.

As is also shown in FIG. 2, the holes 24 and 34 have substantially vertical sidewalls so that the cross-sectional areas within the holes are constant. In one application of this embodiment, the diameters of holes 24 are approximately 2¼ inches and the diameters of holes 34 are approximately 3¼ inches. In other embodiments of the present invention, the sidewalls of either holes 24 and/or holes 34 may be tapered. Thus, the holes 24 and 34 may diverge such that the cross-sectional hole areas at the lower surfaces 26 and 36 are smaller than the cross-sectional hole areas at the upper surfaces 28 and 38. Advantageously, this design will tend to reduce the expansion pressure drop of the coolant water as it flows from the flanges 22 and 32. In other embodiments of the present invention, the holes 24 and 34 may be oblong slots instead of circular.

Figure 3:
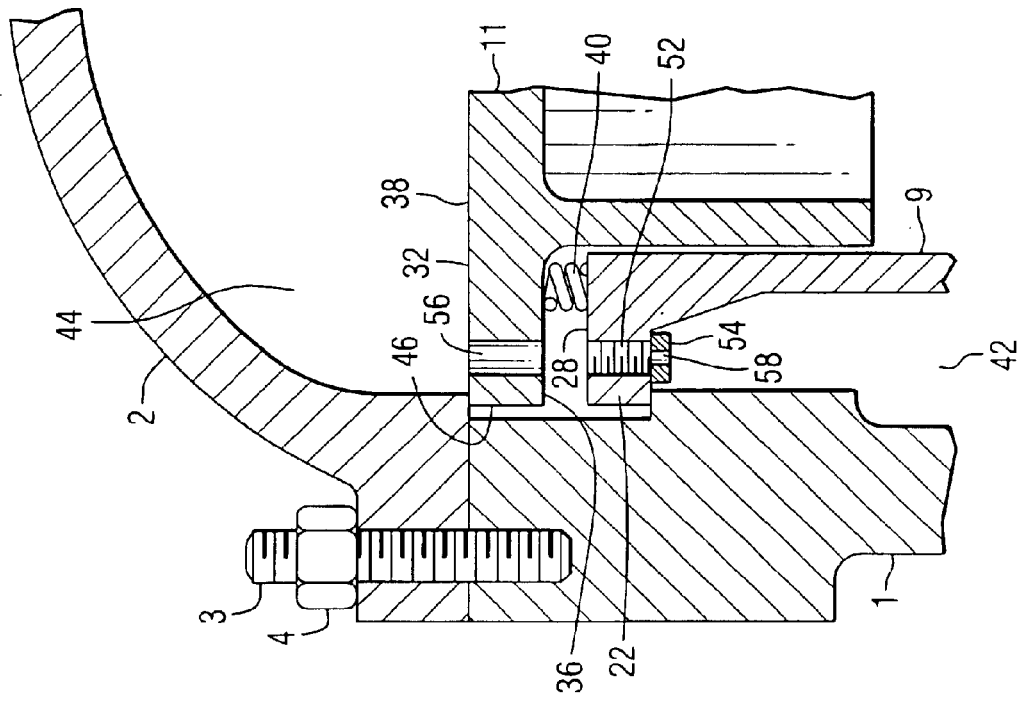
FIG. 3 is an enlarged fragmented sectional view of the RPV taken at the bracket shown in FIG. 1 showing a second embodiment of the present invention.

FIG. 3 illustrates a second embodiment of the present invention in a backfitted RPV having internally threaded lifting holes 52 for receiving the threaded ends of lift rods (not shown), which are employed to transfer the core barrel assembly 9 into the RPV. Cover plates 54 blocking the lifting holes 52 are welded to the bottom surface 26 of the core shroud assembly flange 22 at the time of manufacture for the specific purpose of preventing coolant water flow. The lifting holes 52 are generally aligned with holes 56 in the upper support plate flange 32, which holes 52 and 56 may have the same or different cross-sections. In this embodiment of the present invention, holes 58 are drilled in the cover plates 54, which holes 58 have a different cross-sectional area than the cross-sectional area of the aligned holes 56 in the upper support assembly flange 32. As shown in FIG. 3, the holes 56 in the upper support plate flanges 32 are larger than the holes 58 in the cover plates 54. Advantageously, the flow of coolant water may be controlled by the relative cross-sectional areas of these holes in combination with the threaded configuration of the sidewalls of the core barrel assembly flange lifting holes 52.

Figure 4:
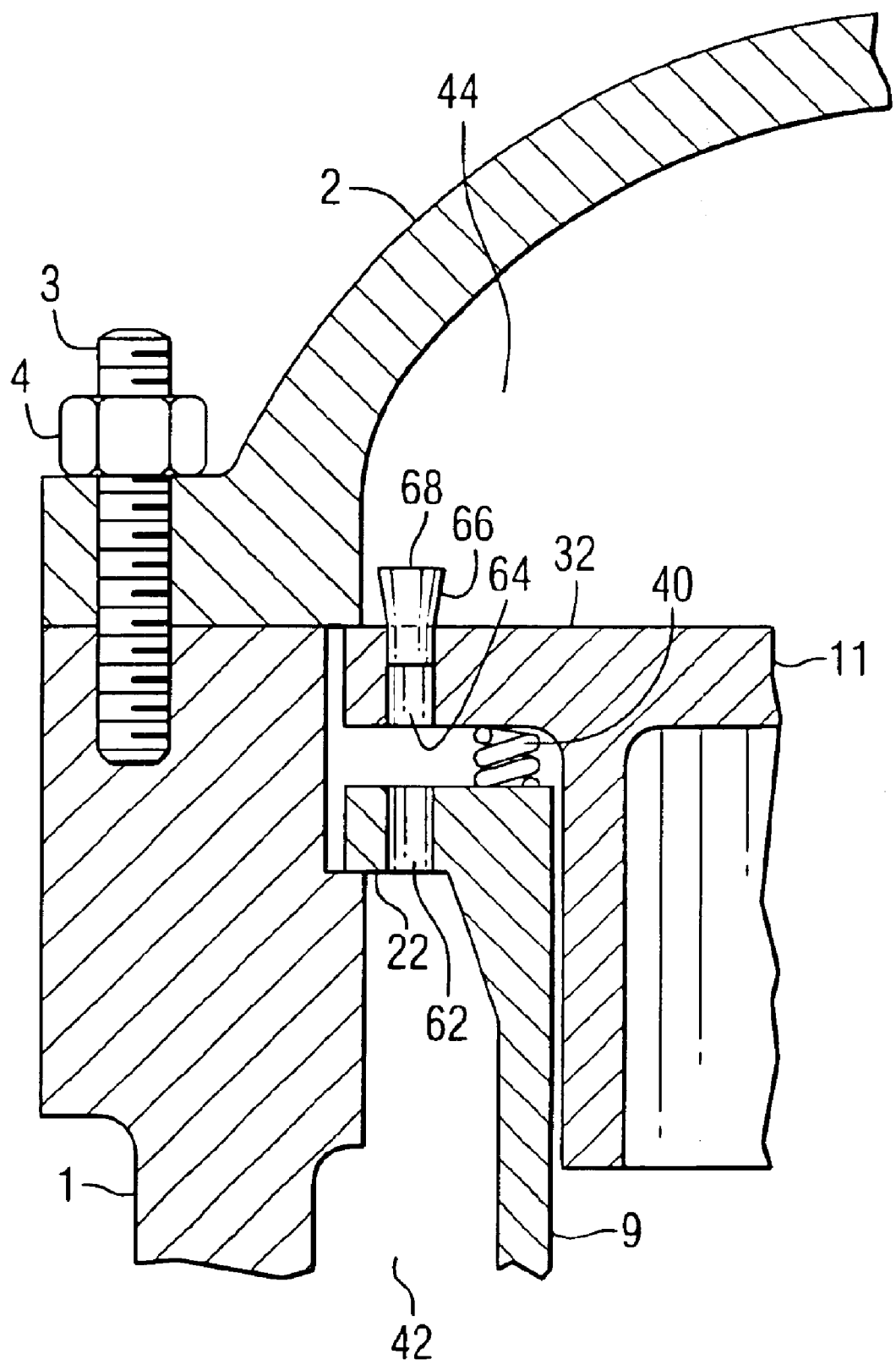
FIG. 4 is an enlarged fragmented sectional view of the RPV taken at the bracket shown in FIG. 1 showing a third embodiment of the present invention.

FIG. 4 illustrates a third embodiment of the present invention in a backfitted RPV having a core barrel assembly flange 22 and an upper support plate flange 32 with aligned holes 62 and 64, respectively. The holes 62 and 64 may have the same or different cross-sections. As shown, exhaust nozzles 66 (or diverging nozzles) are inserted in the holes 64 in the upper support plate flanges 32. Preferably, each exhaust nozzle 66 has one or more exit ports 68 with a total flow area that is different from the cross-sectional area of the aligned hole 62 in the core barrel assembly flange 22. Preferably, the flow area of the exit port 68 is sufficient to reduce the coolant water flow to about 25% of the flow through the hole 62 in the core barrel assembly flange 22. In addition to controlling velocities and pressure drops, exhaust nozzles 66 discharge the coolant water above the bottom surface of the RPV head 2

While present preferred embodiments of the present invention has been shown and described, it is to be understood that the invention may be otherwise variously embodied within the scope of the following claims of invention.

What is claimed is:

1. A reactor pressure vessel (RPV) for containing nuclear fuel assemblies in coolant water, comprising:
   a vessel body having an internal support ledge;
   a removable top head having a flange and an inner surface defining a head cavity;
   a core barrel assembly having a flange supported on the internal support ledge for supporting the fuel assemblies, the core barrel assembly flange having holes extending between a lower flange surface and an upper flange surface, each hole disposed inwardly of the internal support ledge, each hole having a cross-sectional area; and
   an upper support plate having a flange with a lower flange surface and an upper flange surface and a periphery extending between the lower flange surface and the upper flange surface, the lower surface of the upper support plate flange disposed above and spaced from the upper surface of the core barrel assembly flange, the lower surface of the upper support plate flange and the upper surface of the core barrel assembly flange defining an inter-flange cavity, the periphery of the upper support plate flange and the vessel body defining a coolant water leak way in flow communication with the inter-flange cavity, the upper support plate flange having holes extending between its lower surface and its upper surface and aligned with the holes in the core barrel assembly, the holes in the upper support plate flange disposed in coolant flow communication with the holes in the core barrel assembly flange and with the inter-flange cavity and the coolant water leak way, the holes in the upper support plate flange disposed inwardly of the removable top head flange and opening to the head cavity for discharging coolant water along the inner surface of the removable top head, each upper support plate flange hole having a cross-sectional area;
   wherein the cross-sectional area of the core barrel assembly flange hole is smaller than the cross-sectional area of the aligned upper support plate flange hole for controlling leakage of coolant water in the head cavity around the periphery of the upper support plate flange and into the inter-flange cavity and induction of the leaked coolant water by the coolant water flowing into the holes in the upper support plate flange.

2. The reactor pressure vessel of claim 1, wherein the cross-sectional area of each hole in the core barrel assembly flange varies such that the cross-sectional area of the hole at the lower surface of the core barrel assembly flange is smaller than the cross-sectional area of the hole at the upper surface of the core barrel assembly flange.

3. The RPV of claim 1, wherein the cross-sectional area of each hole in the upper support plate flange varies such that the cross-sectional area of the hole at the lower surface of the upper support plate flange is smaller than the cross-sectional area of the hole at the upper surface of the upper support plate flange.

4. The RPV of claim 1, wherein the holes in the core barrel assembly flange are circular.

5. The RPV of claim 4, wherein the holes in the core barrel assembly flange have a diameter of about 2¼ inches.

6. The RPV of claim 5, wherein the holes in the upper support plate flange are circular.

7. The RPV of claim 6, wherein the holes in the upper support plate flange have a diameter of about 3¼ inches.

8. The RPV of claim 1, wherein the holes in the core barrel assembly flange are oblong slots.

9. The RPV of claim 1, wherein the holes in the upper support plate assembly flange are oblong slots.

10. The RPV of claim 1, wherein the ratio of the cross-sectional area of the core barrel assembly flange hole to the cross-sectional area of the aligned upper support plate flange hole is about 0.69.

11. A reactor pressure vessel (RPV) for containing nuclear fuel assemblies in coolant water, comprising:
    a vessel body having an internal support ledge;
    a removable top head having a flange and an inner surface defining a head cavity;
    a core barrel assembly having a flange supported on the internal support ledge for supporting the fuel assemblies;
    an upper support plate having a flange with a lower flange surface and an upper flange surface and a periphery extending between the lower flange surface and the upper flange surface, the lower surface of the upper support plate flange disposed above and spaced from the upper surface of the core barrel assembly flange, the lower surface of the upper support plate flange and the upper surface of the core barrel assembly flange defining an inter-flange cavity; and
    means for diverting coolant water flow into the head cavity from the inter-flange cavity while controlling coolant water leakage from the head cavity into the inter-flange cavity.

12. The reactor pressure vessel of claim 11, wherein the means diverts the coolant water flow while reducing entrainment of leaked coolant water in the inter-flange cavity by the flowing coolant water.

13. In a reactor pressure vessel (RPV) for containing nuclear fuel assemblies in coolant water, comprising:
    a vessel body having an internal support ledge;
    a removable top head having a flange and an inner surface defining a head cavity;
    a core barrel assembly having a flange supported on the internal support ledge for supporting the fuel assemblies, the core barrel assembly flange having an upper surface; and
    an upper support plate having a flange with a lower flange surface and an upper flange surface and a periphery extending between the lower flange surface and the upper flange surface, the lower surface of the upper support plate flange disposed above and spaced from the upper surface of the core barrel assembly flange, the lower surface of the upper support plate flange and the upper surface of the core barrel assembly flange defining an inter-flange cavity;

a method of diverting a flow of coolant water into the top head, comprising the step of:

controlling the flow of coolant water into the head cavity from the inter-flange cavity while controlling leakage of coolant water from the head cavity around the periphery of the upper support plate flange into the inter-flange cavity.

14. The method of claim 13, wherein the step of diverting the flow of coolant water comprises: controlling entrainment of coolant water leaking around the periphery of the upper support plate flange by the flowing coolant water.

* * * * *